March 5, 1968 W. J. KNUEPFER 3,372,246

WATERPROOF PUSHBUTTON TELEPHONE SUBSET

Filed Aug. 14, 1964

INVENTOR
WALTER J. KNUEPFER
BY J. Warren Whitesel
ATTORNEY

United States Patent Office 3,372,246
Patented Mar. 5, 1968

3,372,246

WATERPROOF PUSHBUTTON TELEPHONE SUBSET

Walter J. Knuepfer, La Grange, Ill., assignor to International Telephone and Telegraph Corporation, New York, N.Y., a corporation of Delaware Filed Aug. 14, 1964, Ser. No. 389,676
1 Claim. (Cl. 179—179)

ABSTRACT OF THE DISCLOSURE

A waterproof telephone subset is provided. The set has pushbuttons for dialing which are covered by a resilient boot. The boot permits operation of each button individually while preventing the ingress of water or dust into the set.

This invention relates to waterproof telephone sets and more particularly to sets having key callers.

Waterproof telephone sets are generally used under the most demanding environmental conditions, such as for military field telephones. They may be also used by construction crews, on golf courses, in camping areas, or the like.

These telephone instruments must function properly despite much rough usage. For example, a moment's reflection will bring to mind the havoc which might follow a failure of a military telephone, or a situation where a faulty telephone seized and tied up a significant part of a telephone central office.

Heretofore, waterproof telephones have been either manual or dial type devices having only a limited number of openings. Newer telephones, however, use a multiplicity of pushbuttons or keys for sending a multifrequency signal. These pushbuttons have greatly increased the number of openings in a telephone housing and the likelihood that seepage of moisture might damage components inside the telephone.

Accordingly, an object of the invention is to provide new and improved key-type, waterproof telephones. Another object is to reduce the cost of waterproof telephones by using a maximum number of conventional parts from low cost, mass produced, comercially available telephones.

In keeping with an aspect of this invention, these and other objects are accomplished by a resiliant rubber-like boot which covers the entire key-caller. The boot is provided with a number of dome-shaped sections, each section covering a single pushbutton of the key-caller. Each dome is made with a reduced thickness in the part that is deformed by pushbutton actuating forces. This reduced thickness give a resiliance that restores the rubber boot to a normal shape after it is pushed. The foot of the dome sections of the boot is thick to resist any movement which might translate forces acting upon one pushbutton into forces acting on another pushbutton.

The above mentioned and other features of this invention and the manner of obtaining them will become more apparent, and the invention itself will be best understood by reference to the following description of an embodiment of the invention taken in conjunction with the accompanying drawings, in which.

Figures 2, 3, 4:
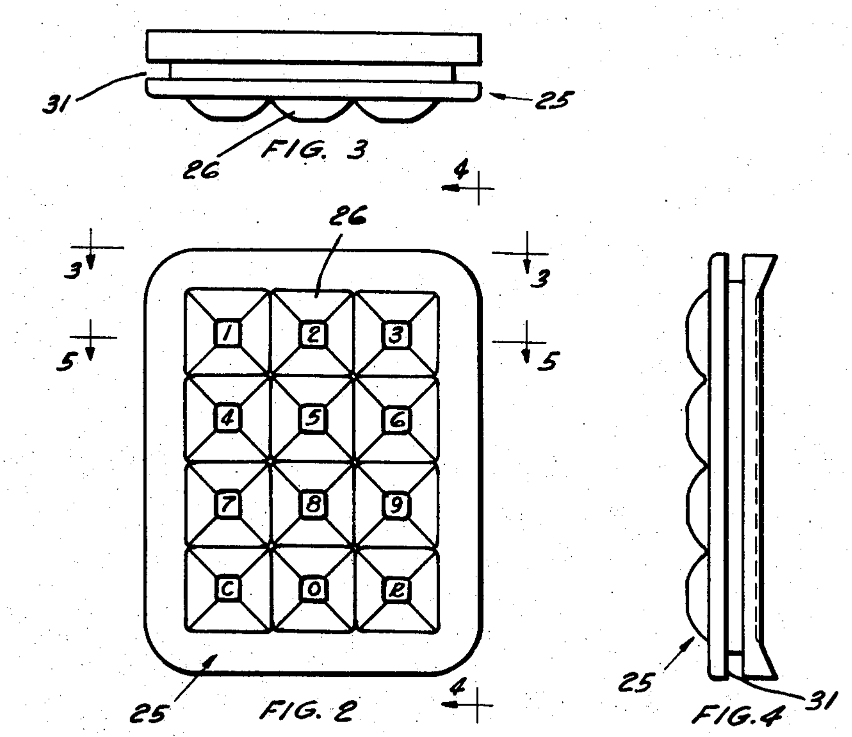
FIG. 2 shows a plan view of the top of the waterproof boot.
FIG. 3 is a plan view, taken along line 3—3 of FIG. 2, which shows an end of the boot.
FIG. 4 is another plan view, taken along line 4—4 of FIG. 2, which shows the side of the boot.
Figure 5:
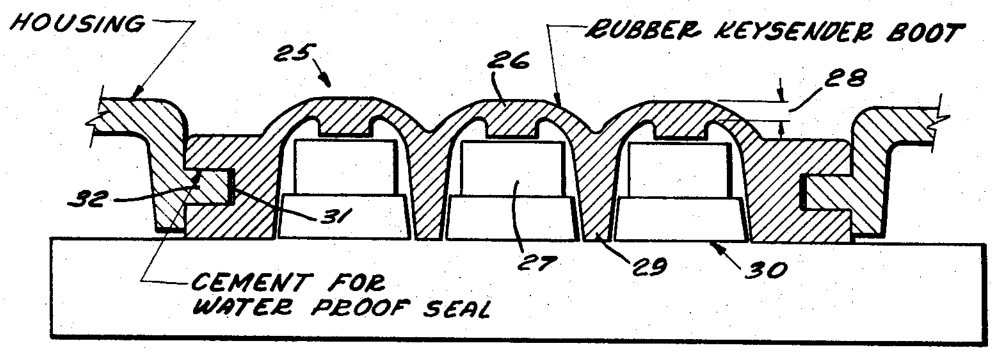
FIG. 5 is a cross section view of the boot taken along 5—5 of FIG. 2.
Figure 1A:
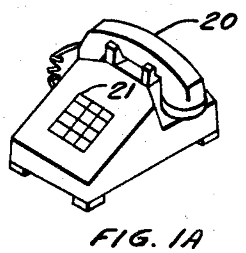
FIG. 1A shows, in perspective, how a waterproof boot is added to a conventional desk type telephone.
Figure 1B:
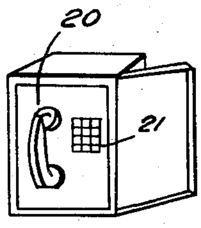
FIG. 1B shows, in perspective, how the waterproof boot is added to a telephone enclosed in a box having a door.

A waterproof telephone may take any convenient form—a desk set as shown in FIG. 1A, or a set enclosed in a covered box as shown in FIG. 1B. The entire housing of the telephone may be sealed by gaskets or dipping. In either case (FIG. 1A or FIG. 1B) there will be a conventional handset 20, resting on a conventional support. The handset will be adapted to open or close hookswitch contacts without allowing entrance of moisture into the housing. For example, the handset may include a permanent magnet and the housing may include reed switches.

A key set caller 21 may be placed on the front of the telephone set, as at 21. This key set may be a commercially available, low cost mass produced device. The problem is that the keys must be free to transmit motion from the outside to the inside of the cabinet. But the keyways must not provide channels for the seepage of moisture.

In accordance with one aspect of the invention, a resiliant boot 25 is adapted to cover the entire key caller. While many materials may be used to make the boot, one exemplary construction had a rubber boot. The boot comprises a number of dome shaped sections, each section covering a single pushbuton or key. For example, dome section 26 covers the pushbutton 27.

All of the dome sections are shaped the same. Near the top (as at 28) the dome is quite thin and resiliant so that any downward forces deform the dome and move the pushbutton. When the forces are removed, the dome restores itself to its original shape responsive to its own resiliance.

The foot of each dome shaped section (as at 29) is relatively thick and rests upon the upper surface 30 of the key caller. This thickness of this foot section makes the boot relatively immobile. Thus, a downward force on any one dome section will not be translated into forces acting upon the pushbutton under any other dome section.

The periphery of the boot is provided with a channel 31. The telephone set housing has a lip 32 complementary to the channel 31. Thus, a waterproof cement may be used to seal the boot to the housing and thereby preserve the waterproof construction.

While the principles of the invention have been described above in connection with specific apparatus and applications, it is to be understood that this description is made only by way of example and not as a limitation on the scope of the invention.

I claim:

1. A waterproof telephone set comprising:

a telephone set with a key set caller, said key set caller including a plurality of individual keys arrayed along an upper surface of the caller, a resilient waterproof boot for covering the entire key set, said boot having a number of dome shaped sections separated by a number of relatively thick non-resilient foot sections, said non-resilient foot sections resting on the upper surface of the caller between keys of the key set to support the dome shaped sections, said dome shaped sections each including a relatively thin resilient portion fitting over the keys and supported between the non-resilient foot sections to permit the translation of downward forces into pushbutton actuating forces on associated keys of said key set, said resilient portion restoring said dome shaped section when said downward forces are removed, said boot having a peripheral channel around its edge, said telephone set including a housing having a lip to which the peripheral channel is complementary, and means for waterproofingly cementing said peripheral channel to said lip.

References Cited

UNITED STATES PATENTS

| | | | |
|---|---|---|---|
| 3,042,764 | 7/1962 | Hermle | 200—168 |
| 3,024,337 | 3/1962 | Goudy et al. | 200—168 |
| 3,246,112 | 4/1966 | Adams et al. | 200—168 |

FOREIGN PATENTS

| | | |
|---|---|---|
| 223,140 | 8/1942 | Switzerland. |
| 1,091,175 | 10/1960 | Germany. |

KATHLEEN H. CLAFFY, *Primary Examiner.*

L. A. WRIGHT, *Assistant Examiner.*